US007406910B2

(12) United States Patent
Schulz et al.

(10) Patent No.: US 7,406,910 B2
(45) Date of Patent: Aug. 5, 2008

(54) DEVICE AND METHOD FOR CONTROLLING THE POSITION OF A PNEUMATIC ACTUATOR

(75) Inventors: Ulrich Schulz, Gruenstadt (DE); Joerg Kiesbauer, Eppertshausen (DE)

(73) Assignee: Samson AG, Frankfurt am Main (DE)

( * ) Notice: Subject to any disclaimer, the term of this patent is extended or adjusted under 35 U.S.C. 154(b) by 178 days.

(21) Appl. No.: 11/526,447

(22) Filed: Sep. 23, 2006

(65) Prior Publication Data

US 2007/0084201 A1 Apr. 19, 2007

(30) Foreign Application Priority Data

Oct. 13, 2005 (DE) ...................... 10 2005 049 061

(51) Int. Cl.
*G05B 24/04* (2006.01)
*G05B 24/00* (2006.01)
*G05D 7/03* (2006.01)
*G05D 7/00* (2006.01)

(52) U.S. Cl. .......................................... 91/361; 60/407

(58) Field of Classification Search .................. 91/361; 60/407

See application file for complete search history.

(56) References Cited

U.S. PATENT DOCUMENTS 5,590,677 A * 1/1997 Kuroda ........................ 137/85
5,878,765 A * 3/1999 Lange ........................... 137/1
5,931,180 A * 8/1999 Nagasaka .................... 91/361
5,934,169 A * 8/1999 Regel ........................... 91/361
6,112,638 A * 9/2000 Loechner .................. 91/363 R
6,349,627 B1 * 2/2002 Nusche ........................ 91/454
6,512,960 B1 * 1/2003 Schulz ........................ 91/361
7,089,086 B2 * 8/2006 Schoonover ................ 700/275

FOREIGN PATENT DOCUMENTS

DE 42 33 301 C1 2/1994
DE 199 21 828 C2 6/2001
DE 697 15 997 T2 1/2003
DE 698 20 653 T2 9/2004
DE 102005049061 10/2005

* cited by examiner

*Primary Examiner*—Thomas E Lazo
(74) *Attorney, Agent, or Firm*—Woodling, Krost and Rust

(57) ABSTRACT

The invention pertains to a device for the controlling the position of a pneumatic actuator comprising:

a pneumatically adjustable actuating element (5);

a pneumatic actuating drive (6) for adjusting the actuating element (5);

an electro-pneumatic position controller (1) for pneumatically driving the actuating drive (6) as a function of a position controller set point and a controlled variable; and at least one main pneumatic power amplifier (10) with bypass throttle for amplifying the power output of the position controller (1) and for pneumatically driving the actuating drive (6).

In addition, a pilot control pneumatic power amplifier (9) with a bypass throttle for preamplifying the pneumatic power output of the position controller (1) is installed between the position controller (1) and the main power amplifier (10).

15 Claims, 3 Drawing Sheets

DEVICE AND METHOD FOR CONTROLLING THE POSITION OF A PNEUMATIC ACTUATOR

The invention pertains to a device for the quick and precise pneumatic control of the position of an actuator according to the introductory clause of Claim 1 and to a corresponding method with the features according to the introductory clause of Claim 8.

In the field of process automation, the flow of materials is usually controlled by actuators. An actuator typically comprises a linear-stroke or rotary adjusting valve as the actuating element, a pneumatic actuating drive, and an electro-pneumatic position controller. The position controller comprises an automatic control circuit, which is subordinated to a primary control circuit of an automatic process control system or of an automatic process controller and which is used to adjust the valve opening of the actuator precisely and quickly within the opening range of 0-100%.

The subordinate automatic control circuit is supplied with a set point by the primary control circuit of the process control system for the automatic control of a process variable such as pressure, temperature, flow rate, tank fill level, etc. The position controller continuously compares the controlled variable to be monitored such as the position of the actuator with the set point and forms a corresponding correcting variable at its output as a function of the control offset to bring the two values closer together, i.e., to match the controlled variable to the set point.

To adjust the valve opening of the actuator, the electro-pneumatic position controller requires auxiliary electric power, an electrical set-point signal (typically in the range of approximately 4-20 mA or a bus signal), and auxiliary pneumatic power in the form of, for example, an air supply pressure which is kept as constant as possible. As a function of the control offset and the direction in which the actuating drive is working, the position controller supplies air to or removes air from a diaphragm chamber of the pneumatic actuating drive, which is frequently equipped with one or more springs on the other side of the diaphragm so that a safety position can be assumed if a defect occurs in the actuator such as the failure of the position controller.

DE 199 21 828 C2 describes an especially reliable method for operating a position controller and a position controller which uses this method.

The actuating speed of an actuator depends on the pneumatic power output of the position controller. Large actuating drives are required for actuators with relatively large nominal diameters or for high process pressures. As a result of the larger surface area of the diaphragm of the pneumatic actuating drive, however, the volume to be filled and vented is also larger, as a result of which the actuating speed decreases at the same pneumatic power output.

To increase the pneumatic power output, therefore, a so-called pneumatic power amplifier, also called a “booster”, is combined with the position controller. The position controller increases or decreases the air pressure on the input diaphragm of the booster in such a way that, when control offsets are present, the booster fills or vents the drive itself with greater power. FIG. 3 shows an actuator 1' with an actuating drive of this type for adjusting a valve 5'. A position controller 2' drives a booster 3', which in turn controls the actuating drive of the actuator 1'. As a rule, a booster of this type has a bypass throttle 4' to prevent instabilities in the position control circuit.

The automatic control process is explained first for the situation in which the bypass throttle 4' is closed: The position controller 2' increases or decreases the air pressure on the control input of the booster 3', which correspondingly fills or vents the pneumatic actuating drive 1'. Via the feedback of the position of the valve 5' to the position controller 2', the controller changes its pneumatic output signal until the control offset approaches zero. To this extent, the control behavior with a closed bypass throttle 4' does not differ from that of an automatic control circuit without a bypass throttle. Because of the high pneumatic power output of the booster 3' and the associated high amplification, however, it is possible, as in all automatic control circuits, for instabilities to occur in the control process.

To avoid this, the bypass throttle 4' is usually opened. At small control offsets, the position controller 2' operates with very low pneumatic power output, and the air flows which are generated flow around the booster 3' via the open bypass throttle 4'. For this reason and also because of its natural hysteresis, the booster 3' does not respond. The actuating drive 1' is in this case filled or vented solely by the position controller 2' until the offset in question has been corrected. The bypass throttle 4' determines the range of set point changes in which the booster 3' remains inactive. The disadvantage, however, is that in this range the reaction times to changes in the set-point signal can be too fast. If the bypass throttle 4' is open too far, furthermore, the opening speed decreases when large changes, e.g., from 0% to 100%, occur in the set-point signal. Adjusting the opening of the bypass throttle 4' is therefore very problematic, because without considerable expense it is usually very difficult in practice to determine the optimum operating point at which instability in the automatic control circuit is avoided while at the same time the control offset is quickly reduced to a sufficient degree.

The task of the present invention is therefore to provide a device for rapidly and precisely controlling pneumatically the position of an actuator and also to provide a corresponding method, where the device and the method do not suffer from the disadvantage described above or suffer from it to only a limited extent.

This task is accomplished by a device for the rapid pneumatic position control of an actuator with the features of Claim 1 and by a corresponding method with the features according to Claim 8. Preferred embodiments of the invention can be derived from the dependent claims.

An essential idea of the invention consists in that, instead of a single pneumatic power amplifier, both a main power amplifier and a pilot control power amplifier installed upstream of the main amplifier are used. The pilot control power amplifier should preferably be designed in such a way that it provides an output which is between the output of the position controller and that of the main power amplifier. The advantage over a single power amplifier is primarily that the position controller and the pilot control power amplifier can respond more quickly to fill or vent a pneumatic actuating drive even when the bypass throttles are relatively wide open, as a result of which the control circuit operates with high stability and high control accuracy without any pronounced overswing behavior.

According to an embodiment, the invention pertains to a device for the position control of a pneumatic actuator comprising:

- a pneumatically adjustable actuating element;
- a pneumatic actuating drive for adjusting the actuating element;
- an electro-pneumatic position controller for pneumatically driving the actuating drive as a function of a position controller set point and a controlled variable; and at least one pneumatic main power amplifier with bypass throttle for amplifying the power output of the position controller and for pneumatically driving the actuating drive.

In addition, a pilot control pneumatic power amplifier with or without a bypass throttle for preamplifying the pneumatic power output of the position controller is installed between the position controller and the main power amplifier. Air is preferably used as the gas for the pneumatic system.

As a rule, the pneumatic power output of the pilot control power amplifier is less than the output of the main power amplifier and greater than the output of the position controller.

A bypass pneumatic power amplifier, which is adjusted so that it operates even at very small changes in the set-point signal of the position controller, can also be connected in parallel to the pilot control power amplifier and the main power amplifier.

In addition, a vent throttle can be installed in the branch between the position controller and the bypass power amplifier. This throttle is adjusted in such a way that the internal working point is shifted and the "reversal error" (i.e., the dead range with very low pneumatic power output) is therefore moved out of the range critical for automatic control, as a result of which venting proceeds more quickly at small control offsets.

Instead of the vent throttle, a volumetric flow controller can be installed between the position controller and the bypass power amplifier. This volumetric flow controller is adjusted in such a way that the internal working point is shifted and the "reversal error" is therefore moved out of the range critical for automatic control, as a result of which venting proceeds more quickly at small control offsets.

Several main power amplifiers connected in parallel can be provided instead of a single one.

According to another embodiment of the invention, an actuator is provided with a device according to one of the embodiments described above.

According to another embodiment of the invention, a method for controlling the position of a pneumatic actuator is provided. The actuator comprises here a pneumatically adjustable actuating element;

a pneumatic actuating drive or booster for adjusting the actuating element;

an electro-pneumatic position controller for pneumatically driving the actuating drive as a function of a position controller set point and a controlled variable; and at least one pneumatic main power amplifier with bypass throttle, which amplifies the power output of the position controller and pneumatically drives the actuating drive. A pilot control pneumatic power amplifier with bypass throttle installed between the position controller and the main power amplifier amplifies and isolates the pneumatic power output of the position controller.

In addition, a bypass pneumatic power amplifier connected in parallel to the pilot control power amplifier and the main power amplifier can amplify the power output of the position controller even when the changes in the position controller's set-point signal are very small.

A vent throttle or a volumetric flow controller, furthermore, can be installed in the branch between the position controller and the bypass power amplifier. This throttle or flow controller can be adjusted in such a way as to shorten the response times at small changes in the position controller's set-point signal by shifting the internal working point so that the "reversal error" is moved out of the range critical for automatic control, as a result of which venting occurs more quickly at small control offsets.

Additional advantages and possible applications of the present invention can be derived from the following description in conjunction with the exemplary embodiments illustrated in the drawings:

Figure 3:
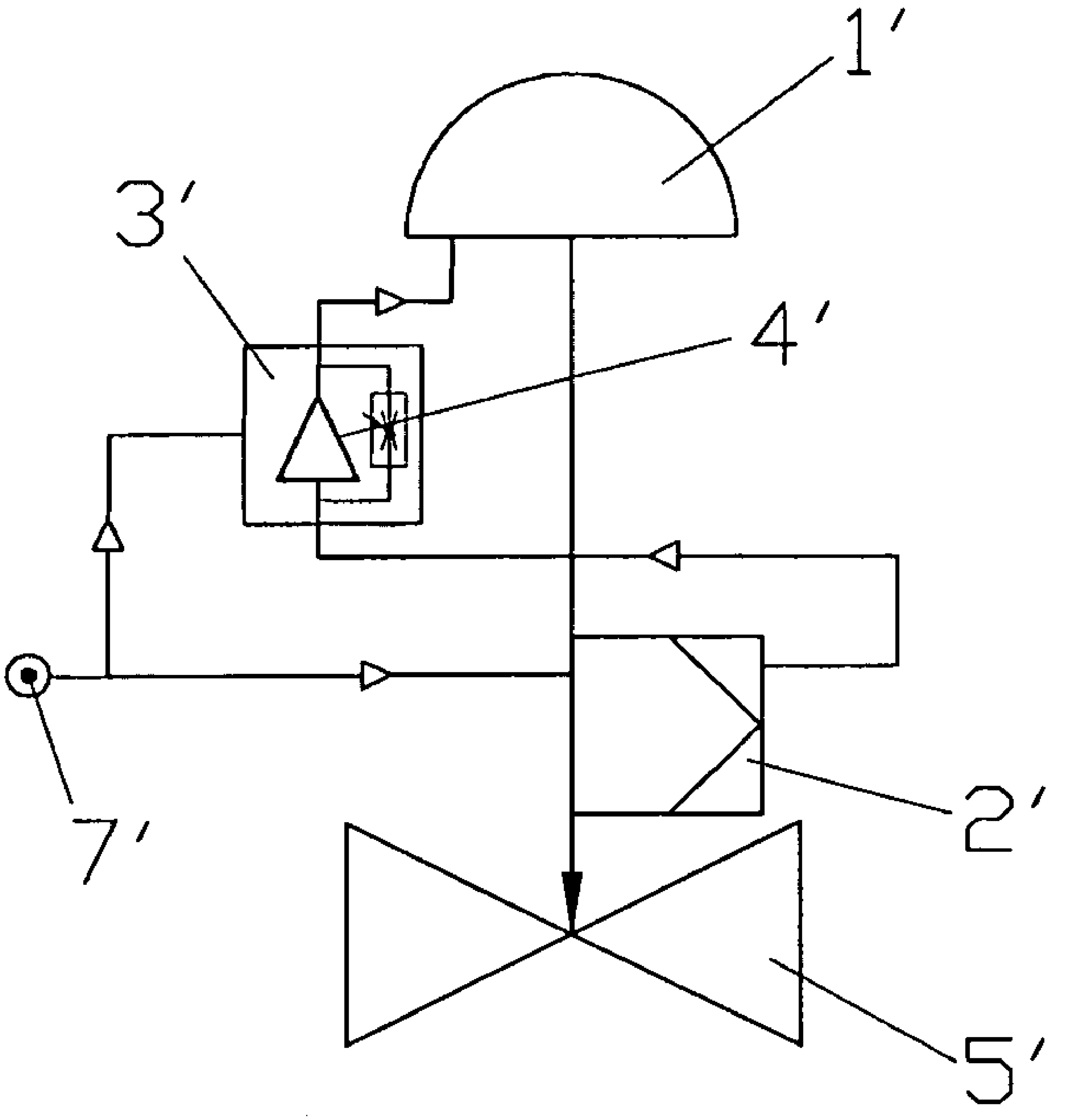
FIG. 3 shows an actuator with a booster.

See the introduction to the specification for a description of FIG. 3.

Figure 1:
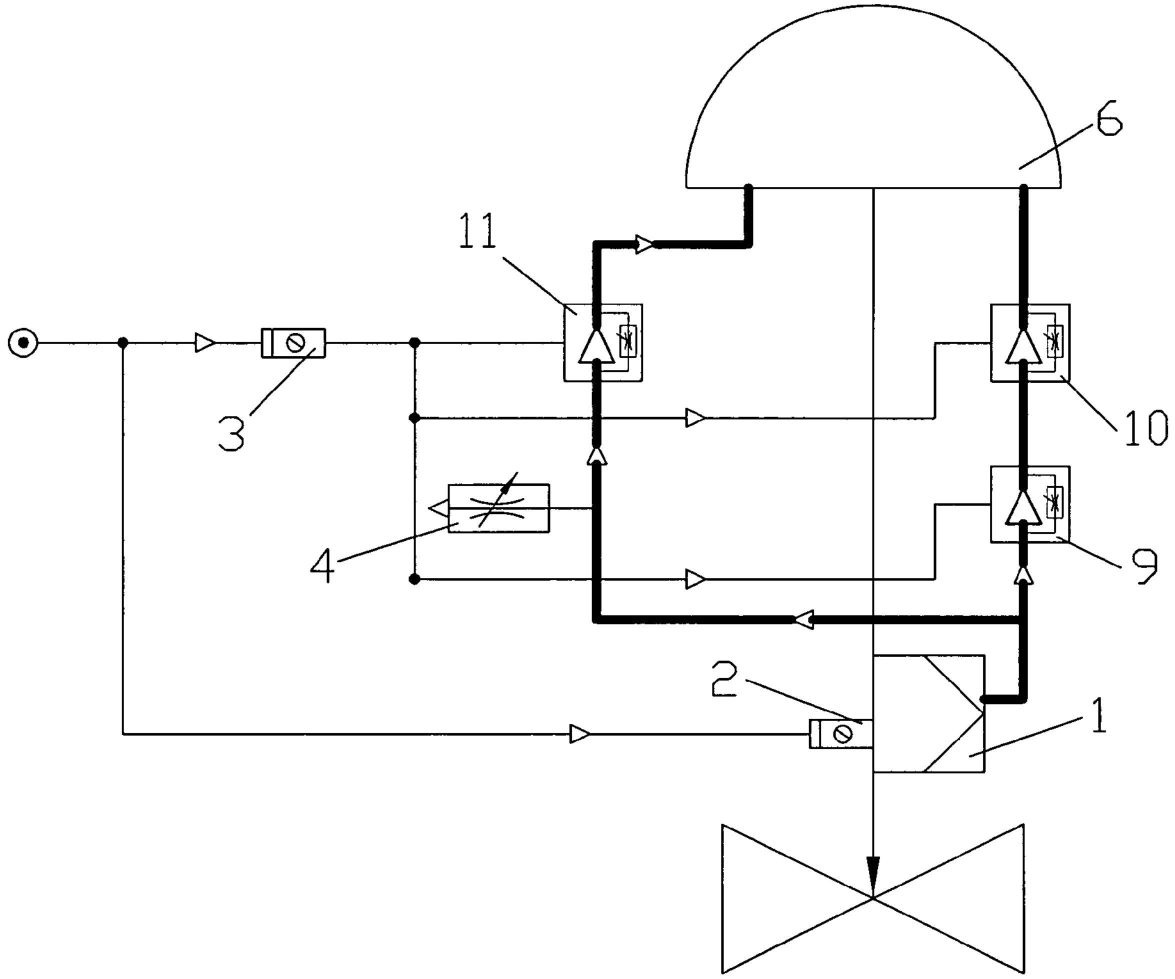
FIG. 1 shows an exemplary embodiment of an actuator according to the invention.

In FIG. 1, a pneumatic actuating drive of an actuator 6 is driven by a main pneumatic power amplifier or main booster 10 and in parallel by a bypass pneumatic power amplifier or bypass booster 11. The two boosters 10 and 11 and a pilot control pneumatic power amplifier or pilot booster 9, which is installed upline from the main booster 10, are supplied with compressed air. In addition, the compressed air also supplies an electro-pneumatic position controller 1. The compressed air is supplied to the feed air stations 2 and 3 via a compressed air feed source 7. In addition, it is also conceivable that separate feed air stations 2 and/or 3 could be used to control the air pressure. A vent throttle 4 is installed in the branch between the bypass booster 11 and the position controller 1. Compressed air can be blown off through this vent throttle to reduce the pressure in the compressed air line between the position controller 1 and the bypass booster 11. All of the boosters 9, 10, and 11 are equipped with bypass throttles.

The way in which the device shown in FIG. 1 works is explained in the following. When the changes in a set-point signal are relatively large, the circuit branch consisting of the series connection of the pilot booster 9 and the main booster 10 is active. The pilot booster 9 usually has a much higher pneumatic power output than the position controller 1, but this output is also considerably smaller than that of the main booster 10. As a result, the position controller 1, together with the prebooster 9, can respond more the main booster 10. The bypass throttles of the boosters 9 and 10 can be opened more widely, which has the effect of providing a high degree of stability of the control circuit and high control accuracy without excessive overswing behavior.

The speed with which adjustments can be made at small changes in the set-point signal, however, especially changes of less than ±2%, is limited. Therefore, in the case of these types of small changes in the set-point signal, the bypass booster 11 is put into service. The bypass throttle of this booster is kept closed, and its characteristic data are similar to those of the pilot booster 9. When the changes in the set-point signal are so small that the two boosters 9 and 10 do not respond, the position controller 1 and the bypass booster 11 together take over the control task. At relatively large changes in the setpoint signal, however, the bypass booster 11 operates only in a supportive role with respect to the two other boosters 9 and 10.

For the normal operation of a position controller without a booster for relatively small actuating drives, it is advantageous with respect to the stability of the control circuit and also with respect to the consumption of air for the position controller to have a "reversal error", that is, for venting to proceed more slowly than filling when the control offsets are relatively small. What this means in practice is that measures for intentionally allowing a small vent stream to escape to the environment are integrated into the position controller 1 to improve the control accuracy under steady-state operating conditions. Although it is true that relatively small set-point signal changes and jumps are effectively corrected in cooperation with the bypass booster 11, jumps which make it necessary for the actuating drive to be vented can lead to long the response times under certain conditions, because the venting stream in the position controller is too small for the purpose.

Figure 2:
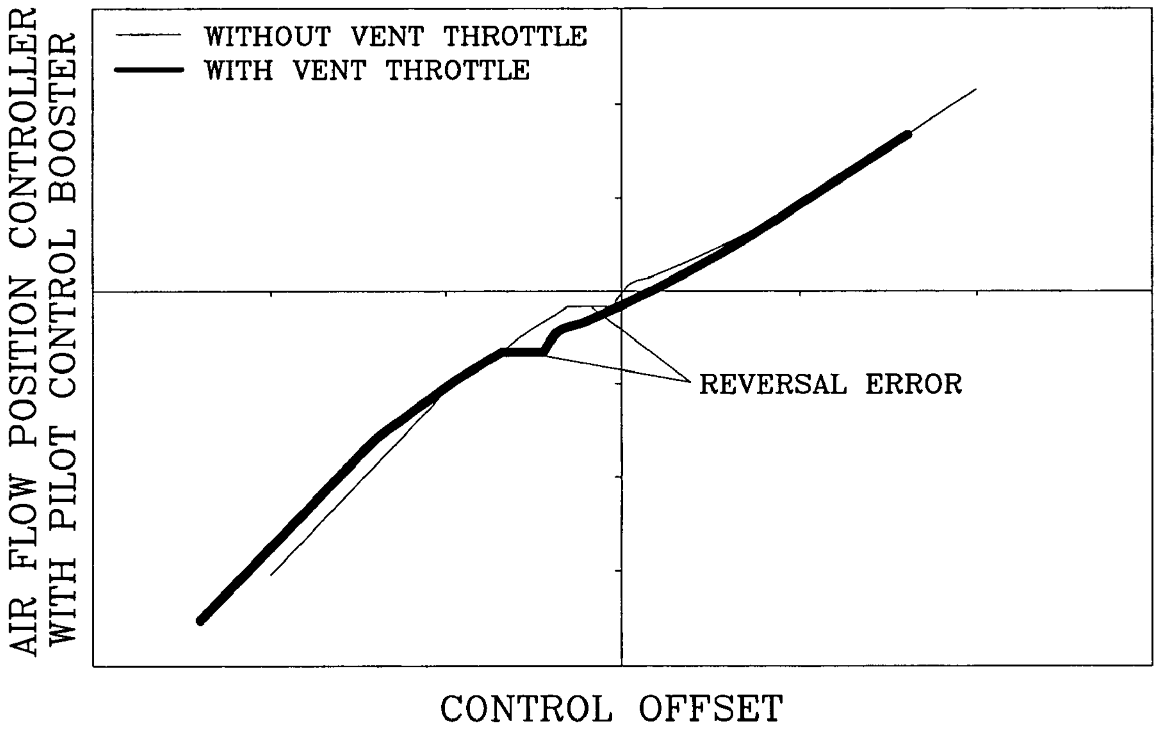
FIG. 2 shows a diagram illustrating how the "reversal error" is shifted by a vent throttle.

To eliminate or at least to minimize this problem, a vent throttle 4 can be installed in the bypass branch. The vent throttle 4 has the effect of shifting the "reversal error" to a different range of relatively large control offsets, where it then in practice no longer has any effect on the control behavior, because in this range it is the main branch with the boosters 9 and 10 which is the dominant factor. FIG. 2 shows a diagram which illustrates the effect of the "reversal error" in the case of a circuit with and without a vent throttle. Alternatively, it is possible to use a volumetric flow controller instead of the vent throttle 4, so that the air stream escaping to the environment remains constant independently of the pressure level in the actuating drive.

The invention makes it possible for an actuator with a large pneumatic actuating drive to exhibit a position control behavior characterized by very high dynamics and short response times as a result of high actuating speeds and also by a high level of control accuracy and stability with high resolution for small changes in the set points.

LIST OF REFERENCE NUMBERS

1 position controller
2, 3 feed air station
4 vent throttle
5 actuating element
6 drive
7 compressed air feed source
9 pilot booster
10 main booster
11 bypass booster
1' actuator with actuating drive
2' position controller
3' booster
4' bypass throttle
5' actuating element
7' compressed air feed source

The invention claimed is:

1. Device for controlling the position of a pneumatic actuator comprising:

a pneumatically adjustable actuating element (5);

a pneumatic actuating drive (6) for adjusting the actuating element (5);

an electro-pneumatic position controller (1) for pneumatically driving the actuating drive (6) as a function of a position controller set point and a controlled variable; and at least one main pneumatic power amplifier (10) with bypass throttle for amplifying the power output of the position controller (1) and for pneumatically driving the actuating drive (6), characterized in that a pilot control pneumatic power amplifier (9) with a bypass throttle for preamplifying the pneumatic power output of the position controller (1) is installed between the position controller (1) and the main power amplifier (10).

2. Device according to claim 1, characterized in that the output of the pilot control power amplifier (9) is usually less than the output of the main power amplifier (10) and greater than the output of the position controller (1).

3. Device according to claim 2, characterized in that, in addition, a bypass pneumatic power amplifier (11) is connected in parallel to the pilot control power amplifier (9) and the main power amplifier (10), the bypass amplifier being adjusted in such a way that it goes into action even at very small changes in the set-point signal of the position controller.

4. Device according to claim 3, characterized in that, in addition, a vent throttle (4) is installed in the branch between the position controller (1) and the bypass power amplifier (11), this throttle being adjusted in such a way as to shift the internal working point so that the "reversal error" is moved out of the range critical for automatic control, as a result of which venting occurs more quickly at small control offsets.

5. Device according to claim 1, characterized in that, in addition, a bypass pneumatic power amplifier (11) is connected in parallel to the pilot control power amplifier (9) and the main power amplifier (10), the bypass amplifier being adjusted in such a way that it goes into action even at very small changes in the set-point signal of the position controller.

6. Device according to claim 5, characterized in that, in addition, a vent throttle (4) is installed in the branch between the position controller (1) and the bypass power amplifier (11), this throttle being adjusted in such a way as to shift the internal working point so that the "reversal error" is moved out of the range critical for automatic control, as a result of which venting occurs more quickly at small control offsets.

7. Device according to claim 5, characterized in that, in addition, a volumetric flow controller is installed between the position controller (1) and the bypass power amplifier (11), this flow controller being adjusted in such a way as to shift the internal working point so that the "reversal error" is moved out of the range critical for automatic control, as a result of which venting occurs more quickly at small control offsets.

8. Device according to claim 1, characterized in that several main power amplifiers connected in parallel are provided.

9. A device according to claim 1 in combination with an actuator.

10. Process for controlling the position of a pneumatic actuator, which comprises a pneumatically adjustable actuating element (5);

a pneumatic actuating drive (6) for adjusting the actuating element (5);

an electro-pneumatic position controller (1) for pneumatically driving the actuating drive (6) as a function of a position controller set point and a controlled variable; and at least one main pneumatic power amplifier (10) with bypass throttle for amplifying the power output of the position controller (1) and for pneumatically driving the actuating drive (6), characterized in that a pilot control pneumatic power amplifier (9) with a bypass throttle for preamplifying the pneumatic power output of the position controller (1) is installed between the position controller (1) and the main power amplifier (10).

11. Process according to claim 10, characterized in that a bypass pneumatic power amplifier (11) installed in parallel to the pilot control power amplifier (9) and the main power amplifier (10) amplifies the power output of the position controller (1) even at small changes in the set-point signal of the position controller.

12. Process according to claim 10, characterized in that a vent throttle (4) or a volumetric flow controller installed between the position controller (1) and the bypass power amplifier (11) shortens the response times at small changes in the set-point signal of the position controller by shifting the internal working point and thus moving the "reversal error" out of the range critical for automatic control, as a result of which venting occurs more quickly.

13. Device for controlling the position of a pneumatic actuator comprising:

a pneumatically adjustable actuating element (5);

a pneumatic actuating drive (6) for adjusting the actuating element (5);

an electro-pneumatic position controller (1) for pneumatically driving the actuating drive (6) as a function of a position controller set point and a controlled variable; and at least one main pneumatic power amplifier (10) with bypass throttle for amplifying the power output of the position controller (1) and for pneumatically driving the actuating drive (6)

characterized in that a pilot control pneumatic power amplifier (9) without a bypass throttle for preamplifying the pneumatic power output of the position controller (1) is installed between the position controller (1) and the main power amplifier (10).

14. Device according to claim 13, characterized in that the output of the pilot control power amplifier (9) is usually less than the output of the main power amplifier (10) and greater than the output of the position controller (1).

15. Device according to claim 13, characterized in that, in addition, a bypass pneumatic power amplifier (11) is connected in parallel to the pilot control power amplifier (9) and the main power amplifier (10), the bypass amplifier being adjusted in such a way that it goes into action even at very small changes in the set-point signal of the position controller.

* * * * *